United States Patent [19]
Welsh

[11] Patent Number: 6,055,941
[45] Date of Patent: May 2, 2000

[54] LEAD ASSEMBLY AND LANYARD ASSEMBLY

[76] Inventor: Sue J. Welsh, 515 N. 100th Pl., Mesa, Ariz. 85207

[21] Appl. No.: 09/268,119

[22] Filed: Mar. 15, 1999

[51] Int. Cl.⁷ ..................................................... A01K 27/00
[52] U.S. Cl. .......................................................... 119/795
[58] Field of Search ......................... 54/34, 69; 119/769, 119/771, 772, 774, 792, 795, 865

[56] References Cited

U.S. PATENT DOCUMENTS

| | | |
|---|---|---|
| 44,665 | 10/1864 | Shaw . |
| 3,139,863 | 7/1964 | Steinbach . |
| 3,605,384 | 9/1971 | Pacini . |
| 4,252,084 | 2/1981 | Willow ....................................... 119/96 |
| 4,541,364 | 9/1985 | Contello . |
| 4,879,972 | 11/1989 | Crowe et al. ............................ 119/109 |
| 5,551,379 | 9/1996 | Hart ........................................ 119/771 |

*Primary Examiner*—Thomas Price
*Attorney, Agent, or Firm*—Parsons & Goltry; Robert A. Parsons; Michael W. Goltry

[57] ABSTRACT

In a horse wearing a halter and another horse supporting a rider seated on a saddle, motion restraint apparatus comprising first, second and third segments each leading to a base, the first segment engagable to the halter, the second segment engagable to the saddle and the third segment available for grasping by the rider.

19 Claims, 2 Drawing Sheets

LEAD ASSEMBLY AND LANYARD ASSEMBLY

FIELD OF THE INVENTION

This invention concerns motion restraint apparatus and, more particularly, apparatus for restraining a horse when led.

BACKGROUND OF THE INVENTION

The term "ponying" is a term skilled artisans use to describe the act of exercising a horse by leading it from another horse. Typically, a lead rope is attached to the halter worn by the horse to be led, and the lead rope is gripped by the rider of the other horse or wrapped around the saddle's horn or pommel. If the led horse balks or becomes frightened and bolts, the rider can be injured by jerking her arm, unbalancing the ridden horse, wrapping the lead rope about the rider, etc. The possibilities for injury in this scenario are endless. To substantially reduce this risk of injury and to provide artisans with a safe means of ponying horses, needed are certain new and useful improvements.

Accordingly, it would be highly desirable to provide improved apparatus for restraining a horse when led and when exercised.

It is a purpose of the invention to provide new and improved apparatus that are easy to construct.

It is another purpose of the invention to provide new and improved apparatus that are easy to use.

It is still another purpose of the invention to provide new and improved apparatus that are inexpensive.

It is a further provision of the invention to substantially minimize the risk of injury to a rider, lead horse, or led horse when leading a horse.

It is still a further provision of the invention to provide a horse rider with a safe means of leading and exercising horses.

SUMMARY OF THE INVENTION

The above problems and others are at least partially solved and the above purposes and others realized in new and improved apparatus for restraining a horse when lead and when exercised. In a led horse wearing a halter and a lead horse supporting a rider seated on a saddle, the invention comprises a lanyard assembly comprising first, second and third segments each leading to a base. The first segment is engagable to the halter, the second segment engagable to the saddle and the third segment available for grasping by the rider. When the lanyard is coupled to the halter of the led horse and with the saddle of the lead horse, the lanyard assembly, halter and saddle are considered to cooperate together as a lead assembly.

BRIEF DESCRIPTION OF THE DRAWINGS

The foregoing and further and more specific objects and advantages of the invention will become readily apparent to those skilled in the art from the following detailed description thereof taken in conjunction with the drawings in which.

DETAILED DESCRIPTION OF A PREFERRED EMBODIMENT

Figure 1:
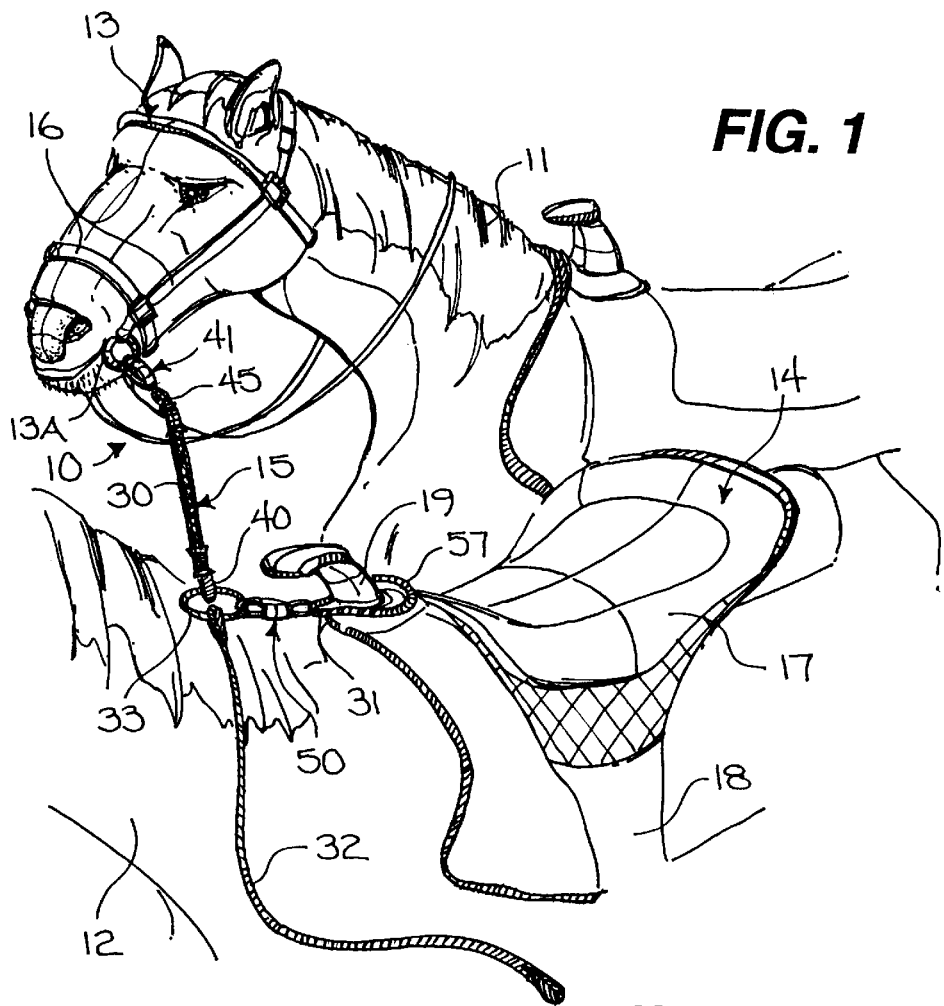
FIG. 1 is a perspective view of a lead assembly shown as it would appear in use with two horses, the lead assembly including a halter worn by one horse, a saddle worn by another horse and a lanyard assembly interconnecting the halter with the saddle.

Turning now to the drawings, in which like reference characters indicate corresponding elements throughout the several views, attention is first directed to FIG. 1 illustrating a perspective view of a lead assembly 10 shown as it would appear in use with two horses 11 and 12. Lead assembly comprises a halter 13 worn by horse 11, a saddle 14 worn by horse 12 and a lanyard assembly 15 interconnecting halter 13 with saddle 14, all of which cooperate together to permit a rider seated on saddle 14 to safely lead and exercise horse 11. Horse 12 is considered the lead horse, and horse 11 is considered the led horse. Halter 13 is of a conventional type comprising a device constructed of rope, leather, canvass or nylon straps 16 that fits around the head as shown or the neck of horse 11 and is used to lead or secure the animal. Saddle 14 is also of a conventional type comprising a device including a seat 17 for accommodating a rider, secured on the back of horse 12 by a girth 18. Like many conventional saddle's, saddle 14 includes a horn or pommel 19.

Figure 2:
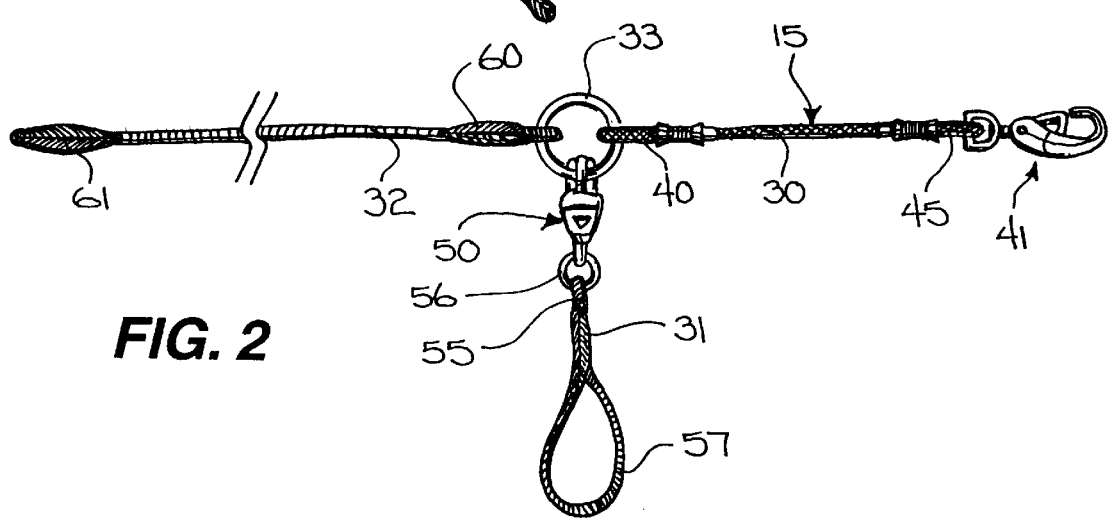
FIG. 2 is a top view of the lanyard assembly of FIG. 1 comprising first, second and third segments coupled to a base, an engagement clip carried by the first segment and a releasable clasp interconnecting the second segment with the base.
Figure 3:
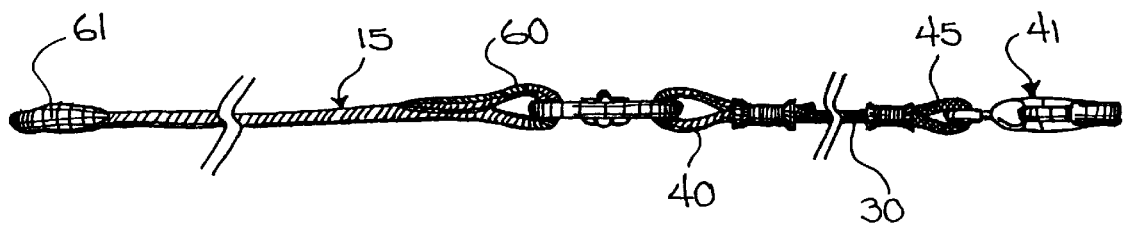
FIG. 3 is a side view of the lanyard assembly of FIG. 2.
Figure 4:
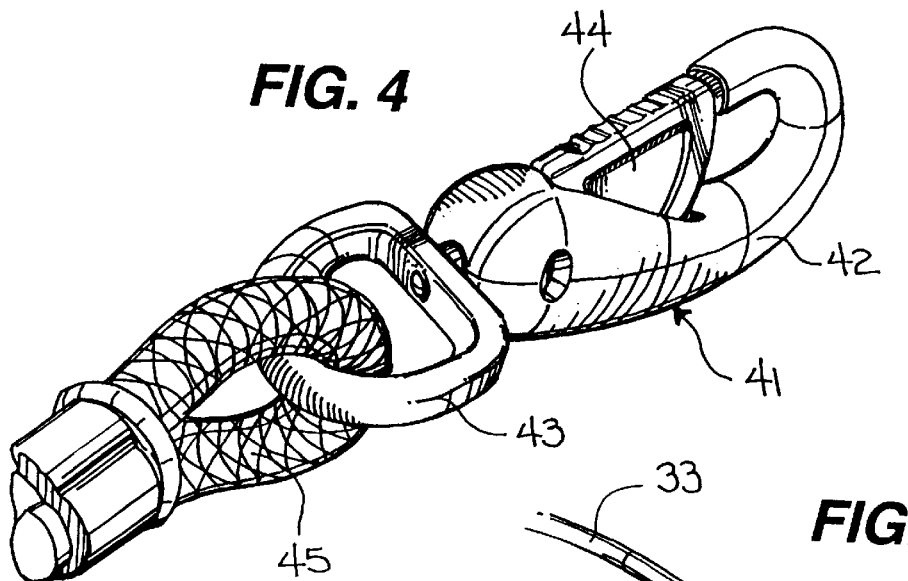
FIG. 4 is an enlarged perspective view of the engagement clip of FIG. 2.

Looking also to FIG. 2, lanyard assembly 15 comprises a plurality of lanyards or segments 30, 31 and 32. Segments 30, 31 and 32 each lead from a base 33 which, in this specific embodiment, includes a continuous body or ring 34 constructed of metal or other substantially rigid material. Base 33 could be provided in other structural forms if desired without departing from the invention. Segment 30 is elongate and includes an end provided in the form of an eye or loop 40 through which base 33 passes for engagement. Loop 40 is formed first by passing a free end of segment 30 through base 33 and then fastening the free end to the standing part of segment 30. The free end can be braided to segment's 30 standing part or fastened with a metallic pinch fastener, a conventional buckle assembly, etc. Segment 30 also includes another end that supports an engagement clip 41 for engagement to halter 13 and, more particularly, with a ring 13A supported by halter 13. Regarding FIG. 4, clip 41 is of a readily available type that includes a hook- or C-shaped body 42 journaled to a ring 43. Body 42 carries a closure 44 for pivotal movement for moving clip 41 between an open condition and a closed condition for engagement to halter 13 as shown. Although not shown, body 42 contains a biasing element, such as a compression spring, for normally biasing closure 44 in the closed condition. To move closure 44, a user need only depress it into body 42 whereupon release, will cause closure 44 to snap back to into its normal position defined as the closed condition of clip 41. The end of segment 30 that supports clip 41 is provided in the form of an eye or loop 45 through which ring 43 passes for engagement. Loop 45 is formed first by passing another free end of segment 30 through base ring 43 and then fastening this other free end to the standing part of segment 30. This other free end can be braided to segment's 30 standing part or fastened with a metallic pinch fastener, a conventional buckle assembly, etc.

Figure 5:
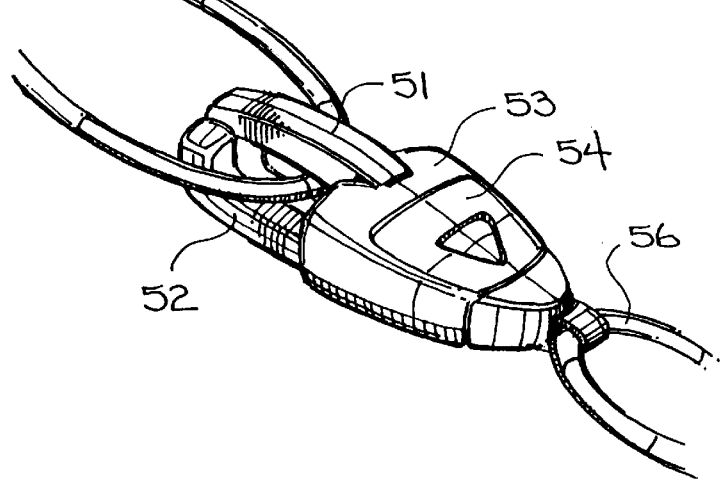
FIG. 5 is an enlarged perspective view of the releasable clasp of FIG. 2.

Regarding FIG. 2, segment 31 includes an end that supports a releasable clasp 50. Regarding FIG. 5, clasp 50 is of a readily available type that includes jaws 51 and 52 mounted with a body 53 for pivotal movement between open and closed conditions. Although not shown, body 53 contains a biasing element, such as a compression spring, for normally biasing jaws 51 and 52 in the closed condition as shown for normally capturing base 33 for engagement. To move jaws 51 and 52 into the open condition, a user need only depress a button 54 carried by body 53 whereupon release, will cause jaws 51 and 52 to snap back into the normal closed condition. The end of segment 31 that supports clasp 50 is provided in the form of an eye or loop 55 through which a ring 56 supported by body 53 passes for engagement. Loop 55 is formed first by passing a free end of segment 31 through ring 56 and then fastening this free end to the standing part of segment 31. This free end can be braided to segment's 31 standing part or fastened with a metallic pinch fastener, a conventional buckle assembly, etc. The other end of segment 31 is also provided in the form of an eye or loop 57. Loop 57 is formed by fastening, such as by braiding or with a metallic pinch fastener or buckle assembly, etc., another free end of segment 31 to its standing part.

Like segments 30 and 31, segment 32 is also elongate and includes an end provided in the form of an eye or loop 60 through which base 33 passes for engagement. Loop 60 is formed first by passing a free end of segment 32 through base 33 and then fastening the free end to the standing part of segment 32. The free end can be braided to segment's 30 standing part or fastened with a metallic pinch fastener, a conventional buckle assembly, etc. Segment 32 extends outwardly from base 33 terminating with another free end 61.

With halter 13 worn by horse 11 and saddle 14 worn by horse 12, a rider may engage segment 30 to halter 13 by engaging clip 41 to halter 13. So engaged, the rider may mount saddle 14 and engage segment 31 to pommel 19 by looping eye 57 of segment 31 over pommel 19 as shown in FIG. 1. While seated upon saddle 14, a rider may grip, such as with one of his or her hands, segment 32 and then proceed to pony, lead or exercise horse 11. The primary coupling between horses 11 and 12 is provided with segments 30 and 31. Segment 32 held by the rider is considered useful for a back up. In this regard, with halter 13 coupled with pommel 19, the rider may proceed to pony horse 11. However, if a problem develops during ponying, clasp 50 can be opened releasing the led horse. If there are narrows and the led horse must fall back behind the ridden horse, clasp 50 can be undone releasing segment from base 33, and horse 11 led by the rider gripping segment 32 in a conventional manner.

Segments 30, 31 and 32 may be constructed of cotton rope, nylon rope, leather, etc. Segment 30 is, however, preferably constructed of elastic or resilient material such as rubber or bungie cord material. By employing elastic material for segment 30, a led horse can resist or pull to some degree and will be gently restrained. One or more of segments 31 and 32 may also be constructed of a resilient material if desired.

Rather than with eyes or loops, segments 30 and 32 may be coupled to base 33 using various kinds of clip or clasp instrumentalities if desired. Furthermore, although this disclosure sets forth specific structural features relating to clip 41 and clasp 50, other forms of clip and clasp instrumentalities may be employed without departing from the invention. Furthermore, although halter 13 and saddle 14 comprise the preferred articles to which lanyard assembly 15 is normally coupled, segment 30 may be coupled to a saddle worn by the led horse if desired, and segment 31 may be coupled to either other locations on saddle 14 or perhaps to another article worn by the lead horse. In this regard, segment 31 may be provided with an additional clip or clasp instrumentality for engagement with a loop supported by saddle 14 or other article worn by the lead horse 12.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. In a first horse wearing a halter and a second horse supporting a rider seated on a saddle, a lanyard assembly comprising first, second and third segments each leading to a base, the first segment engagable to the halter, the second segment engagable to the saddle and the third segment available for grasping by the rider, wherein at least one of the first and second segments is elastic for providing flexible restraint between the first horse and the second horse.

2. The lanyard assembly of claim 1, wherein the second segment is releasably coupled to the base.

3. The lanyard assembly of claim 1, further including a clasp carried by one of the base and the second segment releasably coupling the second segment to the base.

4. The lanyard assembly of claim 1, the saddle including a pommel, wherein the second segment further includes an eye engagable to the pommel.

5. The lanyard assembly of claim 1, wherein the base comprises a ring.

6. An assembly for providing restraint between a first horse and a second horse, comprising:

a halter engagable so as to be worn by the first horse;

a saddle engagable so as to be worn by the second horse; and first, second and third segments each leading to a base, the first segment engaged to the halter, the second segment engaged to a saddle and the third segment available for grasping by a rider seated upon the saddle when worn by the second horse.

7. The assembly of claim 6, wherein at least one of the first, second and third segments is resilient.

8. The assembly of claim 6, wherein the second segment is releasably coupled to the base.

9. The assembly of claim 6, further including a clasp carried by one of the base and the second segment releasably coupling the second segment to the base.

10. The assembly of claim 6, wherein the saddle further includes a pommel, and the second segment further includes an eye engaged to the pommel.

11. The assembly of claim 6, wherein the base comprises a ring.

12. An assembly for providing restraint between a first horse and a second horse, comprising:

a first article engagable so as to be worn by the first horse;

a second article engagable so as to be worn by the second horse; and first, second and third segments each leading to a base, the first segment engaged to the first article, the second segment engaged to the second article and the third segment available for grasping by a rider seated upon a saddle when worn by the second horse.

13. The lead assembly of claim 12, wherein at least one of the first, second and third segments is resilient.

14. The lead assembly of claim 12, wherein the second segment is releasably coupled to the base.

15. The assembly of claim 12, further including a clasp carried by one of the base and the second segment releasably coupling the second segment to the base.

16. The assembly of claim 12, wherein the first article comprises a halter engagable to the head of the first horse.

17. The assembly of claim 12, wherein the second article comprises the saddle.

18. The lead assembly of claim 12, wherein the second article comprises a pommel carried by the saddle.

19. The assembly of claim 18, wherein the second segment further includes an eye engaged to the pommel.

* * * * *